April 17, 1928.
C. P. SCHILPP
1,666,072
SPINNER
Filed Aug. 17, 1927
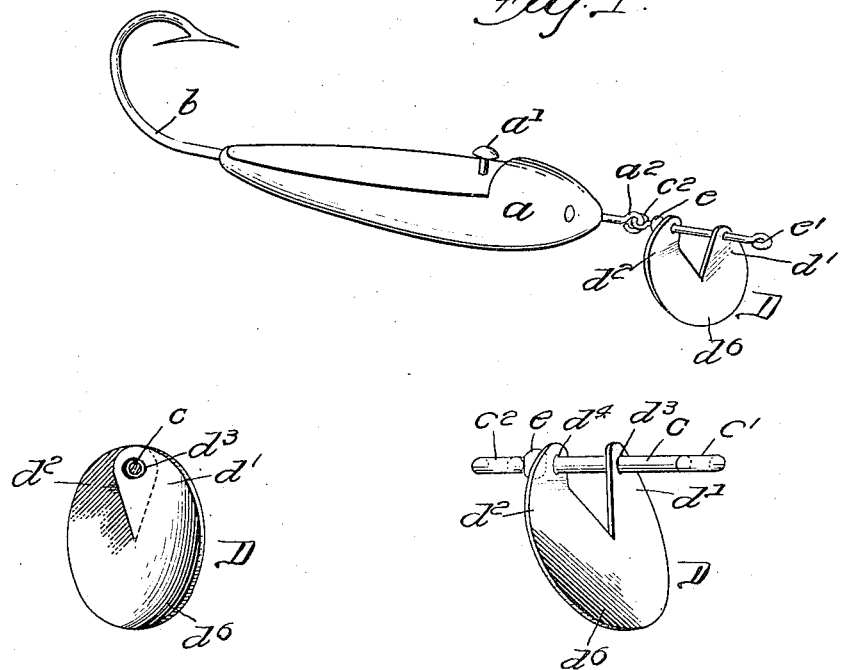
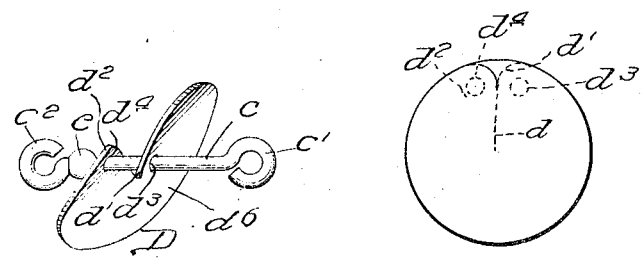
Inventor:
Charles P. Schilpp
by Fred Gerlach
his Atty.

Patented Apr. 17, 1928.

1,666,072

UNITED STATES PATENT OFFICE.

CHARLES P. SCHILPP, OF CLEVELAND HEIGHTS, OHIO, ASSIGNOR TO WILLIAM A. FOSS, OF CLEVELAND, OHIO.

SPINNER.

Application filed August 17, 1927. Serial No. 213,503.

The invention relates to spinners for fish hooks or lures, and its object is to provide an improved spinner which is formed of a single piece of sheet metal or other suitable material, which will be sufficiently rigid so it will not be bent or rendered inoperative by the fish, or obstruction encountered in fishing, and which can be cheaply manufactured.

The invention consists in the several novel features hereinafter set forth and more particularly defined by claims at the conclusion hereof.

In the drawings: Fig. 1 is a perspective of an artificial lure provided with the improved spinner. Fig. 2 is a front elevation. Fig. 3 is a side elevation. Fig. 4 is a plan. Fig. 5 is a face view of the disk before it is cut and bent.

The improved spinnner D is exemplified in a lure comprising a body $a$ to which is fixedly secured a hook $b$, and a stud $a'$ for the attachment of a pork rind strip, as well understood in the art, a rod or pin $c$ on which the spinner is swivelled, having an eye $c'$ at its front end for connection to a swivel or line and an eye $c^2$ at its rear connected to an eye $a^2$ secured in body $a$, and a bead $e$ on the rod to receive the thrust from the spinner. Although it is to be understood that the spinner may be used with any other lure.

The spinner is formed of a disk, preferably cut from sheet metal, and approximately circular. The blank disk is cut on the dotted line $d$, as shown in Fig. 5, intersecting the circumference and extending to about the center of the disk, to form two members $d'$, $d^2$ contiguous to the cut. These portions are then separated transversely by bending one or both transversely to the general plane of the disk. Before these members are bent, holes $d^3$, $d^4$ are punched in their outer corners. The rod $c$ extends through both of these holes so the spinner will have two bearings on the rod, one in front of the other, and will be free to rotate freely around the axis of the rod but will be positively held against backward, forward or longitudinal swinging. When the spinner is on the rod, the latter, being straight where it passes through the members $d'$ $d^2$ will hold the holes $d^3$, $d^4$ in longitudinal alignment and this will bring the general plane of the disk oblique to the axis of the rod, so the disk with its separated members $d'$, $d^2$ will resemble and act as a screw or propeller blade to cause it to spin rapidly when it is drawn through the water. The portion between the members $d'$, $d^2$ forms the blade $d^6$.

The invention exemplifies a spinner consisting of a disk which is split so portions thereof can be offset or bent transversely to the plane of the disk to form front and rear bearing members, which will not easily bend, and which consists of a single piece of metal.

While the disk illustrated is substantially circular, it will be understood that it may be pear-shaped if desired. The spinner may be made to rotate to the right or left as desired, the direction being determined by the bending of the members $d'$, $d^2$. For example, if the member $d'$ is bent to forwardly of the member $d^2$, the disk will be oppositely inclined and rotate in the opposite direction.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A lure comprising a rod and a spinner consisting of a plate cut from its circumference inwardly to provide two members, the members being spaced apart transversely to the general plane of the plate, and each having means in their outer corners to form bearings, one in front of the other, on the rod.

2. A lure comprising a rod and a spinner consisting of a plate cut from its circumference inwardly to provide two members, the members being spaced apart transversely to the general plane of the plate, and having each a perforation in its outer corner, to form bearings, one in front of the other, on the rod.

3. A spinner for artificial lures consisting of a plate with an approximately radial cut extending inwardly from its circumference to its central portion, to form members contiguous to the cut, one member being bent transversely to the general plane of the plate to separate the outer corners of the members, each member having a perforation therein.

4. The combination of a spinner for artificial lures consisting of a plate of sheet metal with an approximately radial cut extending inwardly from its circumference to its central portion to form members contiguous to the cut, one member being bent transversely to the general plane of the plate to separate it transversely from the other, each member having a perforation in its outer corner, and a rod extending through the perforations.

5. A spinner for lures consisting of a plate having a cut extending from its margin inwardly to provide two bearing members, one member being bent transversely to the general plane of the plate to separate it from the other member, said members having perforations to pivotally connect the spinner to a rod.

6. A one-piece spinner for lures consisting of a plate of sheet metal having a cut extending from its circumference inwardly to form two bearing members, one member being bent transversely to separate it from the other member, each member having a perforation to fit around a rod, the perforations being relatively disposed so that when they are aligned by a rod, the general plane of the plate will be oblique to the axis of the rod.

Signed at Cleveland Heights, Ohio, this 10th day of August, 1927.

CHARLES P. SCHILPP.